United States Patent
Katakura et al.

(10) Patent No.: US 10,309,528 B2
(45) Date of Patent: Jun. 4, 2019

(54) VEHICULAR HYDRAULIC CONTROL DEVICE AND VEHICULAR HYDRAULIC CONTROL METHOD

(71) Applicant: JATCO Ltd, Fuji-shi, Shizuoka (JP)

(72) Inventors: Shusaku Katakura, Fujisawa (JP); Yutaka Shimizu, Atsugi (JP); Yusuke Ota, Ebina (JP); Keiichi Nakao, Kanagawa (JP); Shintaro Ohshio, Kanagawa (JP); Hirotaka Suzuki, Kanagawa (JP)

(73) Assignee: JATCO LTD, Fuji-shi (JP)

( * ) Notice: Subject to any disclaimer, the term of this patent is extended or adjusted under 35 U.S.C. 154(b) by 63 days.

(21) Appl. No.: 15/560,642

(22) PCT Filed: Mar. 9, 2016

(86) PCT No.: PCT/JP2016/057412
§ 371 (c)(1),
(2) Date: Sep. 22, 2017

(87) PCT Pub. No.: WO2016/152531
PCT Pub. Date: Sep. 29, 2016

(65) Prior Publication Data
US 2018/0094722 A1    Apr. 5, 2018

(30) Foreign Application Priority Data

Mar. 26, 2015  (JP) .................. 2015-065237

(51) Int. Cl.
*F16H 59/14*   (2006.01)
*F16H 61/02*   (2006.01)
(Continued)

(52) U.S. Cl.
CPC ......... *F16H 61/0276* (2013.01); *F16H 59/14* (2013.01); *F16H 61/0009* (2013.01);
(Continued)

(58) Field of Classification Search
CPC .. F16H 61/0276; F16H 61/0025; F16H 59/14; F16H 61/0031; F16H 2500/50212;
(Continued)

(56) References Cited

U.S. PATENT DOCUMENTS 6,030,313 A    2/2000   Sawada et al.
6,120,413 A    9/2000   Kawamura
(Continued)

FOREIGN PATENT DOCUMENTS

| JP | 2012-030779 A | 2/2012 |
| JP | 2012-031892 A | 2/2012 |
| JP | 2012-097813 A | 5/2012 |

OTHER PUBLICATIONS

English translation of JP2012031892A; http://translationportal.epo.org; dated Oct. 24, 2018 (Year: 2018).*

*Primary Examiner* — Roger L Pang
(74) *Attorney, Agent, or Firm* — Foley & Lardner LLP

(57) ABSTRACT

The present invention is configured such that: in a stopped state of an electric oil pump (M/O/P), control of the electric oil pump (M/O/P) is started such that, when a driver has the intention of demanding drive force, a discharge pressure takes on a target hydraulic pressure ($P_{Th}$) determined in accordance with the demanded drive force from the driver; and a pressure regulation target value of a line pressure regulation valve (101) is set to a value that is higher than or equal to the target hydraulic pressure ($P_{Th}$). Thus, it is possible to provide a vehicular hydraulic control device capable of suppressing hunting in line pressure (PL) when the line pressure (PL) is regulated so as to take on the target hydraulic pressure ($P_{Th}$).

7 Claims, 6 Drawing Sheets

(51) Int. Cl.
*F16H 61/00* (2006.01)
*F16H 61/06* (2006.01)
*B60W 30/18* (2012.01)
*F16H 59/18* (2006.01)

(52) U.S. Cl.
CPC ..... *F16H 61/0025* (2013.01); *F16H 61/0028* (2013.01); *F16H 61/0206* (2013.01); *B60W 30/18018* (2013.01); *B60Y 2200/92* (2013.01); *F16D 2500/30425* (2013.01); *F16D 2500/30803* (2013.01); *F16D 2500/50212* (2013.01); *F16H 59/18* (2013.01); *F16H 61/0031* (2013.01); *F16H 2061/062* (2013.01); *F16H 2312/14* (2013.01); *Y10T 477/69395* (2015.01); *Y10T 477/693973* (2015.01)

(58) Field of Classification Search
CPC ........... F16H 2312/14; F16H 2061/062; F16H 59/18; B60W 30/18018; B60Y 2200/92
See application file for complete search history.

(56) References Cited

U.S. PATENT DOCUMENTS

| | | |
|---|---|---|
| 8,763,736 B2 | 7/2014 | Mochiyama et al. |
| 9,309,881 B2 * | 4/2016 | Uda .................. F04B 49/06 |
| 9,334,816 B2 * | 5/2016 | Yamanaka .............. F02D 29/00 |
| 2004/0038774 A1 | 2/2004 | Kuroda et al. |
| 2011/0319227 A1 | 12/2011 | Kamada et al. |
| 2012/0103709 A1 | 5/2012 | Mochiyama et al. |
| 2015/0345634 A1 * | 12/2015 | Tatewaki ............ F16H 61/0206 192/3.57 |
| 2018/0106363 A1 * | 4/2018 | Katakura ................ F16H 59/14 |

* cited by examiner

VEHICULAR HYDRAULIC CONTROL DEVICE AND VEHICULAR HYDRAULIC CONTROL METHOD

TECHNICAL FIELD

The present invention relates to a vehicular hydraulic control device and a vehicular hydraulic control method for regulating a discharge pressure of an oil pump by a line pressure regulation valve, and controlling a line pressure to a target hydraulic pressure, wherein the target hydraulic pressure is determined in accordance with a driver-requested driving force.

BACKGROUND ART

Conventionally, a vehicular hydraulic control device is known which is configured to regulate, by a line pressure regulation valve, pressure of working oil discharged from an oil pump, and control a line pressure to a specific target hydraulic pressure, wherein the target hydraulic pressure is set based on a driver-requested driving force (see a patent document 1, for example).

However, in the conventional vehicular hydraulic control device where the line pressure is regulated by the line pressure regulation valve, hunting (undershooting and overshooting) of the line pressure may occur, for example, in a situation where the oil pump starts to be driven and the line pressure is regulated from a state where working oil is drained from a hydraulic circuit due to stop of the oil pump or the like. For example, hunting of the line pressure causes a problem where hydraulic pressure supply becomes excessive or short at a part controlled by the line pressure or a hydraulic pressure produced by regulating the line pressure, thereby causing an unnecessary gearshift, or causing a clutch or a belt to slip.

The present invention is made with attention to the problem described above, and is targeted for providing a vehicular hydraulic control device capable of suppressing a line pressure from hunting when regulating the line pressure to a target hydraulic pressure.

PRIOR ART DOCUMENT(S)

Patent Document(s)

Patent Document 1: JP 2012-097813 A

SUMMARY OF THE INVENTION

In order to accomplish the target described above, according to the present invention, a vehicular hydraulic control device comprises: a hydraulic pressure source; a line pressure regulation valve configured to regulate a discharge pressure outputted from the hydraulic pressure source; and a hydraulic pressure controller configured to control a flow rate of discharge of the hydraulic pressure source and a pressure regulation target value of the line pressure regulation valve. The hydraulic pressure controller is configured to perform a first operation in response to an indication of driver's request for driving force when the hydraulic pressure source is at rest, wherein the first operation includes: starting to control the hydraulic pressure source in a manner to conform the discharge pressure to a target hydraulic pressure, wherein the target hydraulic pressure is determined in accordance with a driver-requested driving force; and setting the pressure regulation target value of the line pressure regulation valve greater than or equal to the target hydraulic pressure.

In the vehicular hydraulic control device according to the present invention, the hydraulic pressure controller starts to control the hydraulic pressure source in the manner that the discharge pressure conforms to the target hydraulic pressure, in response to a determination of an indication of driver's request for driving force when the hydraulic pressure source is at rest. Furthermore, the pressure regulation target value of the line pressure regulation valve is set greater than or equal to the target hydraulic pressure. With this configuration, when the line pressure is regulated to the target hydraulic pressure, the hydraulic pressure (the discharge pressure) supplied to the line pressure regulation valve from the hydraulic pressure source becomes equal to the target hydraulic pressure, whereas the pressure regulation target value of the line pressure regulation valve becomes greater than or equal to the target hydraulic pressure equal to the supply hydraulic pressure. Accordingly, no pressure regulation is performed by the line pressure regulation valve, and the line pressure is regulated to the target hydraulic pressure by control of the hydraulic pressure source. This serves to prevent the line pressure from hunting due to pressure regulation based on the line pressure regulation valve.

MODE(S) FOR CARRYING OUT THE INVENTION

Figure 1:
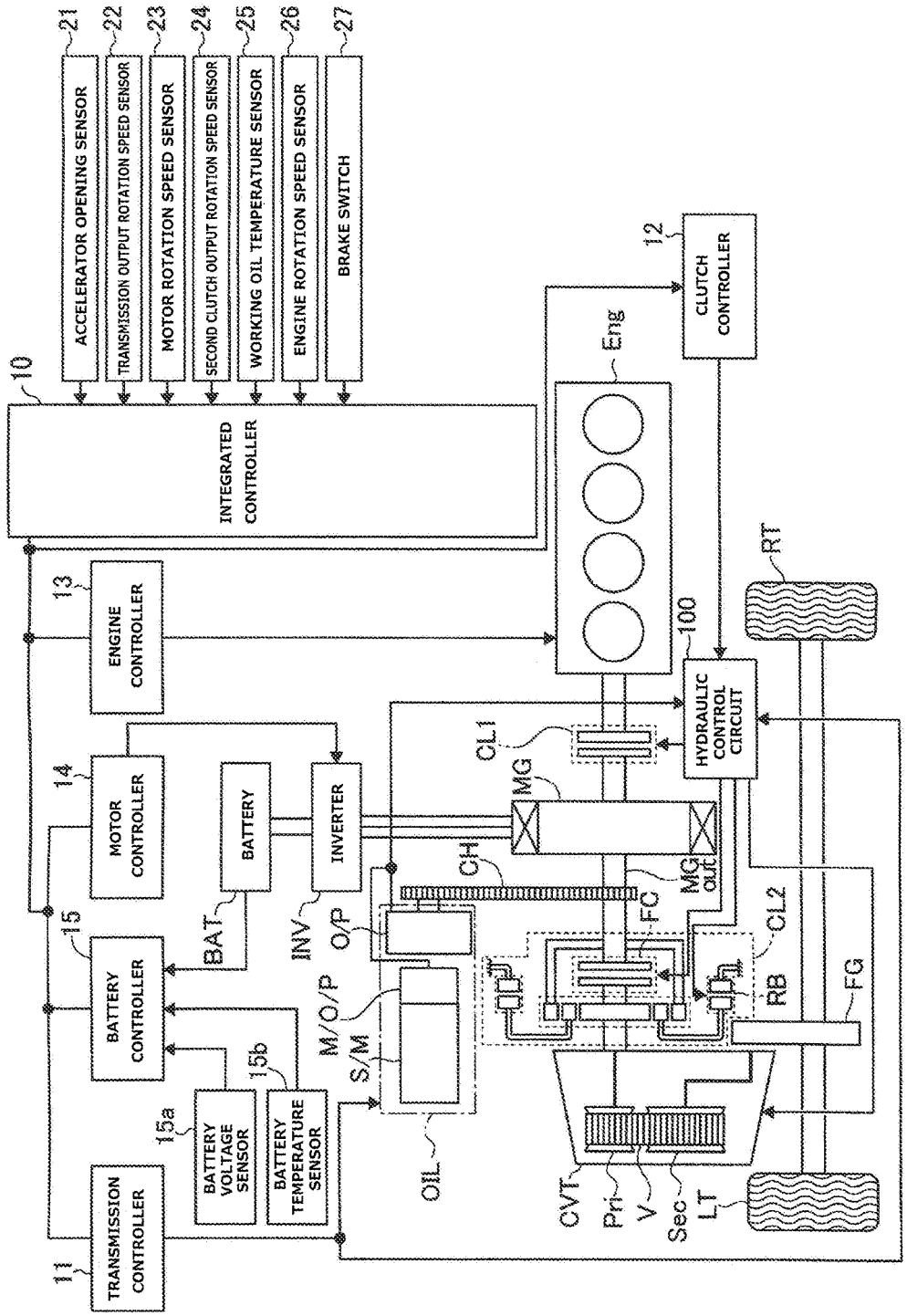
FIG. 1 is a whole system diagram showing a hybrid vehicle to which a control device according to a first embodiment is applied.

The following describes a mode for carrying out a vehicular hydraulic control device according to the present invention, with reference to a first embodiment shown in the drawings.

First Embodiment

First, the following describes configuration of the vehicular hydraulic control device according to the first embodiment, separately in sections [Whole System Configuration of Hybrid Vehicle], [Detailed Configuration of Hydraulic Control Circuit], and [Configuration of Process of Line Pressure Control].

[Whole System Configuration of Hybrid Vehicle]

FIG. 1 is a whole system diagram showing a hybrid vehicle as an example of vehicle, to which a control device according to a first embodiment is applied. The following describes whole system configuration of the hybrid vehicle according to the first embodiment with reference to FIG. 1.

The vehicular hydraulic control device according to the first embodiment is applied to the hybrid vehicle shown in FIG. 1. The hybrid vehicle includes a driveline, wherein the driveline includes an engine "Eng", a first clutch CL1, a motor generator "MG", a second clutch CL2, a continuously variable transmission "CVT", a final gear "FG", a left driving wheel "LT", and a right driving wheel "RT".

Engine Eng is configured to perform lean-burn operation, and is controlled to conform an engine torque to a target value, by control of an intake air quantity by a throttle actuator, control of a fuel injection quantity by an injector, and control of an ignition timing by an ignition plug.

First clutch CL1 is disposed between engine Eng and motor generator MG. For example, first clutch CL1 is implemented by a dry-type clutch that is normally-opened by a biasing force of a diaphragm spring. First clutch CL1 is configured to provide complete engagement, half engagement, and disengagement between engine Eng and motor generator MG. With first clutch CL1 completely engaged, a motor torque and the engine torque are transmitted to second clutch CL2. With first clutch CL1 disengaged, only the motor torque is transmitted to second clutch CL2. The control among complete engagement/half engagement/disengagement is implemented by a stroke control of a hydraulic pressure actuator.

Motor generator MG serves as a vehicle drive source, and has an alternating current synchronous motor structure. When the vehicle is started or running, motor generator MG is controlled by a driving torque control and a rotational speed control. When the vehicle is braked or decelerating, motor generator MG is controlled by a regenerative brake control to collect a kinetic energy of the vehicle into a battery "BAT".

Second clutch CL2 is a frictional engagement element disposed between motor generator MG and left and right driving wheels LT, RT. In this example, second clutch CL2 is implemented by a hydraulically-operated wet-type multiplate friction clutch. Second clutch CL2 is controlled by a second clutch hydraulic pressure among complete engagement/slip engagement/disengagement. In the first embodiment, second clutch CL2 is implemented by a forward clutch "FC" and a rearward brake "RB" which are provided in a forward-rearward switching mechanism of continuously variable transmission CVT based on a planetary gear arrangement. Namely, when the vehicle is running forward, forward clutch FC is employed as second clutch CL2, and when the vehicle is running rearward, rearward brake RB is employed as second clutch CL2.

Continuously variable transmission CVT is a belt-type continuously variable transmission including a primary pulley "Pri", a secondary pulley "Sec" (driving force transmission part), and a pulley belt "V", wherein pulley belt V is wound over primary pulley Pri and secondary pulley Sec. Each of primary pulley Pri and secondary pulley Sec is supplied with a hydraulic pressure such that a pulley width varies with pulley belt V sandwiched, and the diameter of surfaces sandwiching the pulley belt V thereby varies to control a transmission ratio (pulley ratio) as desired.

Motor generator MG includes a motor output shaft "MGout" which is connected to an input gear of a mechanical oil pump "O/P" (first oil pump) via a chain "CH".

Mechanical oil pump O/P is an oil pump driven by a rotational driving force of motor generator MG, and is implemented by a gear pump or a vane pump, for example. Mechanical oil pump O/P is configured to discharge working oil independently of a rotational direction of motor generator MG.

As a hydraulic pressure source, an electric oil pump "M/O/P" (second oil pump) is further provided and configured to be driven by a rotational driving force of an auxiliary motor "S/M" (electric motor) provided in addition to motor generator MG. Electric oil pump M/O/P has a three-phase alternating current motor structure, and is configured to be controlled by a rotational speed control to control a flow rate of discharged working oil.

Mechanical oil pump O/P and electric oil pump M/O/P constitute a hydraulic pressure supply source "OIL" for generating working oil pressures (control pressures) supplied to first and second clutches CL1, CL2 and continuously variable transmission CVT. In hydraulic pressure supply source OIL, electric oil pump M/O/P is stopped by stopping the auxiliary motor S/M, when the discharge flow rate from mechanical oil pump O/P is sufficient. When the discharge flow rate from mechanical oil pump O/P falls, electric oil pump M/O/P is operated by driving the auxiliary motor S/M, thereby also discharging working oil.

The hybrid vehicle thus includes a drive system of one-motor and two-clutches type including first clutch CL1, motor generator MG, and second clutch CL2. The drive system employs an EV mode and an HEV mode as main drive modes. The EV mode is an electric vehicle mode in which only motor generator MG is employed as a drive source with first clutch CL1 disengaged and second clutch CL2 engaged. The HEV mode is a hybrid vehicle mode in which engine Eng and motor generator MG are employed as drive sources with first and second clutches CL1, CL2 engaged.

In the first embodiment, the hybrid vehicle includes a control system which includes an inverter "INV", battery BAT, an integrated controller 10, a transmission controller 11, a clutch controller 12, an engine controller 13, a motor controller 14, and a battery controller 15, as shown in FIG. 1.

Inverter INV is configured to perform conversion from direct current to alternating current, and thereby generate a driving current for motor generator MG. By reversing the phase of the generated driving current, output rotation of motor generator MG is reversed.

Battery BAT is a rechargeable and dischargeable secondary battery, and is configured to supply electric power to motor generator MG, and charge electric power regenerated by motor generator MG.

Integrated controller 10 is configured to calculate a target driving torque corresponding to a driver-requested driving force, based on a state of the battery (inputted from battery controller 15), an accelerator opening (sensed by an accelerator opening sensor 21), a vehicle speed (value synchronized with a transmission output rotational speed, sensed by a transmission rotational speed sensor 22). Based on the result, integrated controller 10 calculates command values for the actuators (motor generator MG, engine Eng, first clutch CL1, second clutch CL2, and continuously variable transmission CVT), and sends the command values to controllers 11 to 15. Integrated controller 10 serves as a hydraulic pressure controller configured to control the discharge flow rate of electric oil pump M/O/P, and control a pressure regulation target value of a line pressure regulation valve 101 described below. Specifically, when determining an indication of driver's request for driving force when hydraulic pressure supply source OIL is at rest, integrated controller 10 sets the pressure regulation target value of line pressure regulation valve 101 greater than or equal to a target hydraulic pressure $P_{Th}$, and starts to control electric oil pump M/O/P in a manner to conform a line pressure "PL" to target hydraulic pressure $P_{Th}$.

Transmission controller 11 is configured to perform a shift control to achieve a shift command from integrated controller 10. The shift control is implemented by employing as an original pressure the line pressure PL supplied via a line pressure circuit 101c, and controlling hydraulic pressures supplied to primary pulley Pri and secondary pulley Sec of continuously variable transmission CVT. A surplus pressure, which is caused when the hydraulic pressure supplied to primary pulley Pri and the hydraulic pressure supplied to secondary pulley Sec are generated from line pressure PL, is used to cool and lubricate the first clutch CL1 and second clutch CL2.

Clutch controller 12 is configured to receive input of a second clutch input rotational speed (sensed by a motor rotational speed sensor 23), a second clutch output rotational speed (sensed by a second clutch output rotational speed sensor 24), and a clutch oil temperature (sensed by a working oil temperature sensor 25). Clutch controller 12 is further configured to perform a first clutch control and a second clutch control to achieve a first clutch control command and a second clutch control command from integrated controller 10, respectively. The first clutch control is implemented by employing as an original pressure the line pressure PL supplied via line pressure circuit 101c, and controlling a hydraulic pressure supplied to first clutch CL1. The second clutch control is implemented by employing as an original pressure the line pressure PL supplied via line pressure circuit 101c, and controlling a hydraulic pressure supplied to second clutch CL2. A surplus pressure, which is caused when the hydraulic pressure supplied to first clutch CL1 and the hydraulic pressure supplied to second clutch CL2 are generated from line pressure PL, is used to cool and lubricate the first clutch CL1 and second clutch CL2.

The circuit for supplying control hydraulic pressures to primary pulley Pri and secondary pulley Sec of continuously variable transmission CVT, and second clutch CL2, based on line pressure PL as the original pressure, is referred to as a transmission mechanism use hydraulic pressure system "Sup". The circuit for cooling and lubricating the second clutch CL2 is referred to as a transmission mechanism cooling and lubricating system "Lub" (see FIG. 2).

Engine controller 13 is configured to receive input of an engine rotational speed (sensed by an engine rotational speed sensor 26), and perform a torque control of engine Eng to achieve an engine torque command value corresponding to a target engine torque from integrated controller 10.

Motor controller 14 is configured to receive input of a motor rotational speed (sensed by motor rotational speed sensor 23), and control the motor generator MG to achieve a motor torque command value and a motor rotational speed command value corresponding to a target motor torque from integrated controller 10.

Furthermore, the first embodiment is configured to perform an idle stop control to stop both of engine Eng and motor generator MG while an idle stop condition is satisfied where the vehicle is stationary with an accelerator-off state (sensed by an accelerator opening sensor 21) and a brake-on state (sensed by a brake switch 27). While the idle stop condition is satisfied, auxiliary motor S/M is also stopped. This causes both of mechanical oil pump O/P and electric oil pump M/O/P to stop, so that hydraulic pressure supply source OIL stops hydraulic pressure supply.

Battery controller 15 is configured to manage the state of charge of battery BAT, and send information of the state of charge of battery BAT to integrated controller 10. The state of charge of battery BAT is calculated based on a power supply voltage sensed by a battery voltage sensor 15a and a battery temperature sensed by a battery temperature sensor 15b.

[Detailed Configuration of Hydraulic Control Circuit]

Figure 2:
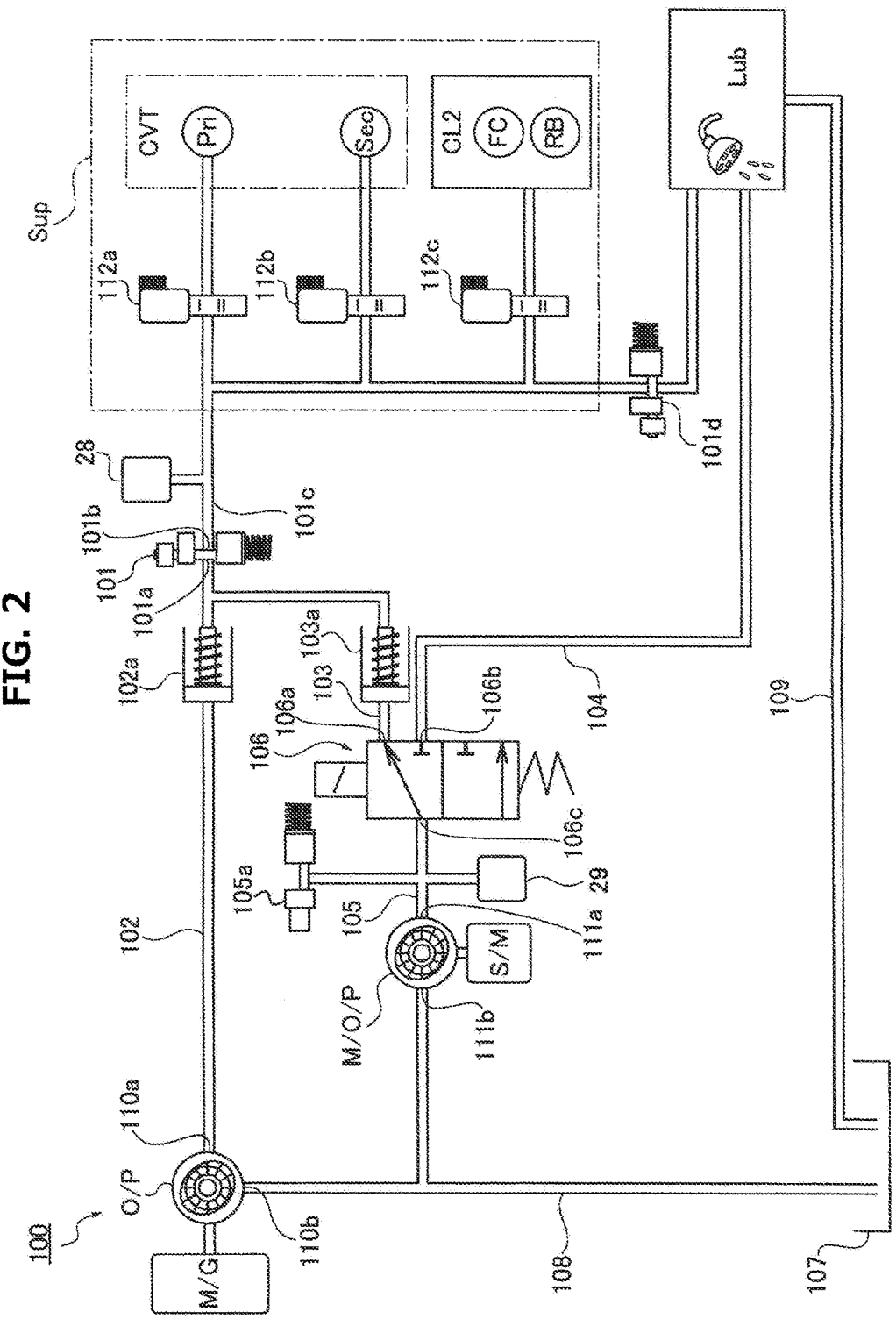
FIG. 2 is a hydraulic circuit diagram showing a hydraulic control circuit provided in the hybrid vehicle according to the first embodiment.

FIG. 2 is a hydraulic circuit diagram showing a hydraulic control circuit 100 provided in the hybrid vehicle according to the first embodiment. The following describes detailed configuration of hydraulic control circuit 100 with reference to FIG. 2.

Hydraulic control circuit 100 is configured to regulate a discharge pressure of hydraulic pressure supply source OIL, which is composed of mechanical oil pump O/P and electric oil pump M/O/P, to line pressure PL, and supply the line pressure PL to transmission mechanism use hydraulic pressure system Sup. Hydraulic control circuit 100 is further configured to supply the transmission mechanism cooling and lubricating system Lub with a surplus pressure caused when hydraulic pressure is supplied to transmission mechanism use hydraulic pressure system Sup. Hydraulic control circuit 100 is further configured to directly supply the transmission mechanism cooling and lubricating system Lub with working oil discharged from electric oil pump M/O/P, by switching a switching valve 106. Specifically, as shown in FIG. 2, hydraulic control circuit 100 according to the first embodiment incudes mechanical oil pump O/P, electric oil pump M/O/P, line pressure regulation valve 101, a first hydraulic pressure supply oil passage 102, a second hydraulic pressure supply oil passage 103, a cooling system oil passage 104, an electric oil pump discharge oil passage 105, and switching valve 106.

Mechanical oil pump O/P includes a discharge port 110a connected to first hydraulic pressure supply oil passage 102, and includes a suction port 110b connected to a suction circuit 108, wherein suction circuit 108 sucks working oil collected in an oil pan 107. Mechanical oil pump O/P is configured to be driven by rotational drive of motor generator MG, and suck working oil from oil pan 107 via suction circuit 108, and discharge working oil to first hydraulic pressure supply oil passage 102. The discharge flow rate of mechanical oil pump O/P depends on the rotational speed of motor generator MG.

Electric oil pump M/O/P includes a discharge port 111a connected to electric oil pump discharge oil passage 105, and includes a suction port 111b connected to suction circuit 108, wherein suction circuit 108 sucks working oil collected in oil pan 107. Electric oil pump M/O/P is configured to be driven by rotational drive of auxiliary motor S/M, and suck working oil from oil pan 107 via suction circuit 108, and discharge working oil to electric oil pump discharge oil passage 105. The discharge flow rate of electric oil pump M/O/P depends on the pump rotational speed. Namely, the flow rate of discharge from electric oil pump M/O/P per one rotation of electric oil pump M/O/P has a unique value, so that the pump rotational speed is proportional to the pump discharge flow rate in a range of the rotational speed (flow rate) up to a specific value. Accordingly, determining a target rotational speed for electric oil pump M/O/P is equivalent to commanding a flow rate for electric oil pump M/O/P.

Line pressure regulation valve 101 is a pressure regulation valve configured to regulate the discharge flow rate of hydraulic pressure supply source OIL (the discharge flow rate of mechanical oil pump O/P and/or the discharge flow rate of electric oil pump M/O/P), and thereby produce the line pressure PL supplied to transmission mechanism use hydraulic pressure system Sup. Specifically, line pressure regulation valve 101 includes an input port 101a connected to first hydraulic pressure supply oil passage 102 and second hydraulic pressure supply oil passage 103, and includes an output port 101b connected to a line pressure circuit 101c leading to transmission mechanism use hydraulic pressure system Sup. The line pressure PL is regulated by line pressure regulation valve 101 based on a command value from integrated controller 10, by reducing the opening of input port 101a by movement of a spool, while increasing the opening of a drain port not shown and thereby causing the surplus part of the working oil, which is supplied from first hydraulic pressure supply oil passage 102 and/or second hydraulic pressure supply oil passage 103, to escape into a drain circuit not shown. Line pressure circuit 101c is provided with a pressure regulation valve 101d for causing the surplus pressure, which is obtained by subtracting the hydraulic pressure required for transmission mechanism use hydraulic pressure system Sup from line pressure PL, to escape into transmission mechanism cooling and lubricating system Lub. Line pressure circuit 101c is further provided with a line pressure sensor 28 for monitoring the line pressure PL supplied to transmission mechanism use hydraulic pressure system Sup. Line pressure sensor 28 obtains a sensed value that is a value obtained by removing oscillating components by filtering.

First hydraulic pressure supply oil passage 102 includes a first end connected to discharge port 110a of mechanical oil pump O/P, and a second end connected to input port 101a of line pressure regulation valve 101, and is configured to supply the input port 101a of line pressure regulation valve 101 with the working oil discharged from mechanical oil pump O/P. Namely, the hydraulic pressure in first hydraulic pressure supply oil passage 102 is equal to the discharge pressure from mechanical oil pump O/P. First hydraulic pressure supply oil passage 102 includes an intermediate section provided with a first flapper valve 102a. First flapper valve 102a serves as a valve for preventing working oil from flowing from line pressure regulation valve 101 to mechanical oil pump O/P.

Second hydraulic pressure supply oil passage 103 includes a first end connected to a hydraulic pressure supply side port 106a of switching valve 106, and a second end connected to input port 101a of line pressure regulation valve 101, and is configured to supply the input port 101a of line pressure regulation valve 101 with the working oil discharged from electric oil pump M/O/P. Namely, the hydraulic pressure in second hydraulic pressure supply oil passage 103 is equal to the discharge pressure from electric oil pump M/O/P. Second hydraulic pressure supply oil passage 103 includes an intermediate section provided with a second flapper valve 103a. Second flapper valve 103a serves as a valve for preventing working oil from flowing from line pressure regulation valve 101 into electric oil pump M/O/P.

Cooling system oil passage 104 includes a first end connected to a cooling side port 106b of switching valve 106, and a second end connected to transmission mechanism cooling and lubricating system Lub, and is configured to supply the transmission mechanism cooling and lubricating system Lub with the working oil discharged from electric oil pump M/O/P. The working oil used in transmission mechanism cooling and lubricating system Lub is collected in oil pan 107 via a drain circuit 109.

Electric oil pump discharge oil passage 105 includes a first end connected to discharge port 111a of electric oil pump M/O/P, and a second end connected to an input port 106c of switching valve 106, and is configured to supply the second hydraulic pressure supply oil passage 103 or cooling system oil passage 104 with the working oil discharged from electric oil pump M/O/P, via the switching valve 106. Electric oil pump discharge oil passage 105 is provided with a pressure sensor 29 and a pressure leak valve 105a, wherein pressure sensor 29 is configured to sense the discharge pressure of electric oil pump M/O/P. Pressure leak valve 105a is configured to open and cause the working oil in electric oil pump discharge oil passage 105 to be released, when the pressure of electric oil pump discharge oil passage 105 monitored by pressure sensor 29 reaches a predetermined upper limit of pressure.

Switching valve 106 is provided in electric oil pump discharge oil passage 105, and is configured to connect the electric oil pump discharge oil passage 105 to one of second hydraulic pressure supply oil passage 103 and cooling system oil passage 104, based on a switching command from integrated controller 10. Specifically, switching valve 106 includes an on-off solenoid valve and a switching valve, and is configured to connect the electric oil pump discharge oil passage 105 to second hydraulic pressure supply oil passage 103 with input port 106c communicated with hydraulic pressure supply side port 106a. With input port 106c communicated with cooling side port 106b in switching valve 106, electric oil pump discharge oil passage 105 is connected to cooling system oil passage 104.

Transmission mechanism use hydraulic pressure system Sup includes a primary pressure regulation valve 112a, a secondary pressure regulation valve 112b (power transmission part pressure regulation valve), and a second clutch use pressure regulation valve 112c, which are provided in line pressure circuit 101c. Primary pressure regulation valve 112a regulates line pressure PL as the original pressure into a hydraulic pressure supplied to primary pulley Pri, and supplies the regulated hydraulic pressure to primary pulley Pri. Secondary pressure regulation valve 112b regulates line pressure PL as the original pressure into a hydraulic pressure supplied to secondary pulley Sec, and supplies the regulated hydraulic pressure to secondary pulley Sec. Second clutch use pressure regulation valve 112c regulates line pressure PL as the original pressure into a hydraulic pressure supplied to forward clutch FC and rearward brake RB, and supplies the regulated hydraulic pressure to forward clutch FC and rearward brake RB.

Each of line pressure regulation valve 101, primary pressure regulation valve 112a, secondary pressure regulation valve 112b, second clutch use pressure regulation valve 112c, and pressure regulation valve 101d is configured to adjust the opening of the input port and the opening of the drain port, and implement pressure regulation by causing a surplus part of the supplied working oil to escape into the drain circuit. Accordingly, in each valve, as the opening of the input port increases, the quantity of working oil flowing into the drain circuit decreases, and the quantity of working oil flowing into a downstream side of the valve increases. In each valve, when the hydraulic pressure of working oil supplied is lower than the pressure regulation target value, no working oil flows into the drain circuit, and the valve is put in a so-called fully-open state where the opening of the input port is maximized. In the fully-open state, all of the supplied working oil flows into the downstream side, and no working oil is drained into the drain circuit. Namely, in each valve, if the pressure regulation target value is set higher than the supplied hydraulic pressure, the valve is put into the fully-open state in which no pressure regulation is made.

[Configuration of Process of Line Pressure Control]

Figure 3:
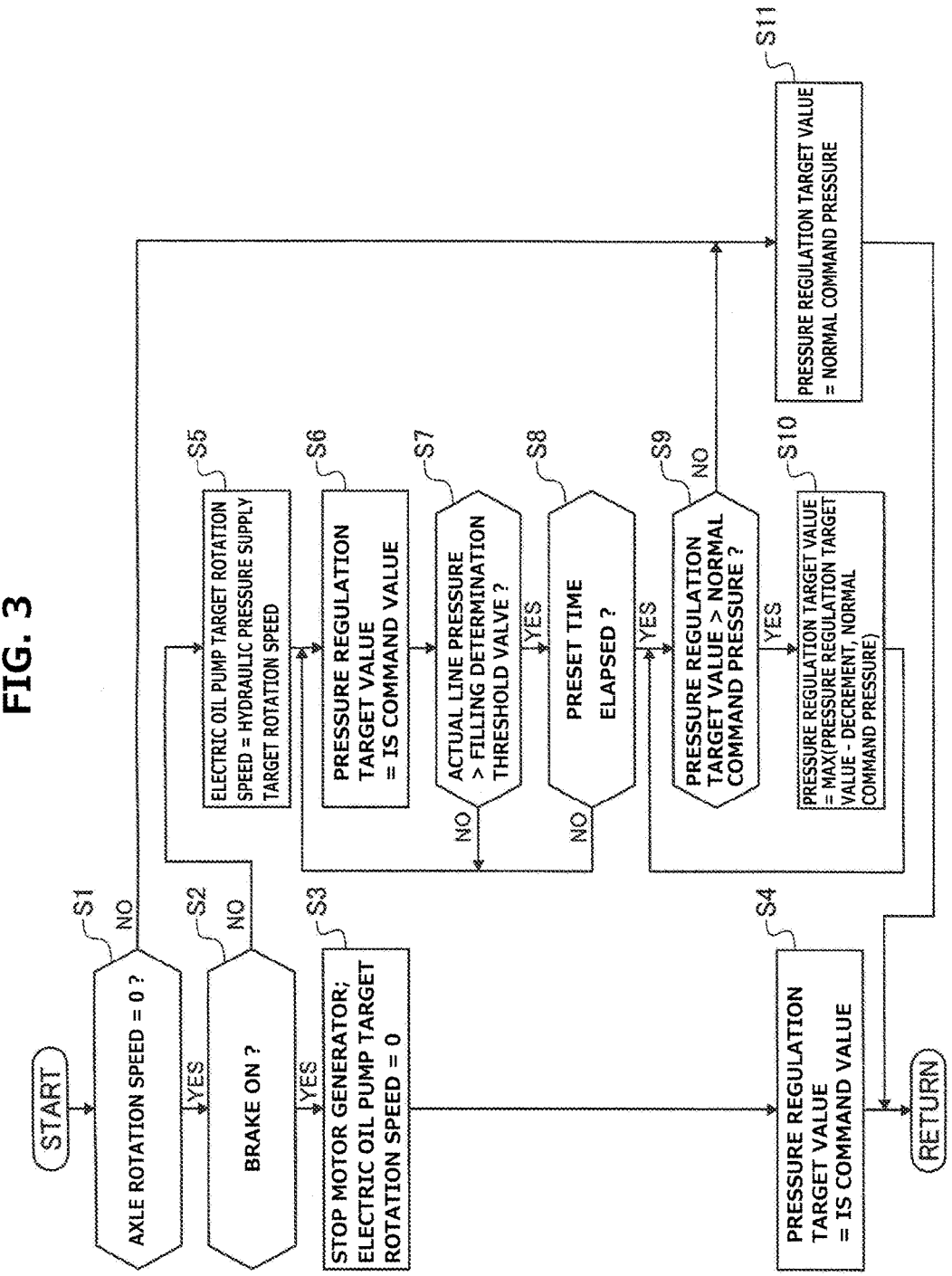
FIG. 3 is a flow chart showing a flow of a process of line pressure control, which is executed by an integrated controller according to the first embodiment.

FIG. 3 is a flow chart showing a flow of a process of line pressure control, which is executed by integrated controller 10 according to the first embodiment. The following describes steps of FIG. 3 showing configuration of the line pressure control process according to the first embodiment.

At Step S1, integrated controller 10 determines whether or not a rotational speed of an axle is equal to zero, namely, whether or not the vehicle is stationary. In case of YES (the axle rotational speed=0), integrated controller 10 determines that the vehicle is stationary, and then proceeds to Step S2. In case of NO (the axle rotational speed>0), integrated controller 10 determines that the vehicle is running, and then proceeds to Step S11. The rotational speed of the axle is determined based on the second clutch output rotational speed sensed by second clutch output rotational speed sensor 24.

At Step S2, following the determination at Step S1 that the axle rotational speed is equal to zero, integrated controller 10 determines whether the brake is in on-state, namely, whether or not the brake is depressed. In case of YES (the brake is on), integrated controller 10 assumes that the idle stop control will be performed because the vehicle is completely stationary and no driver's request for driving force is present, and then proceeds to Step S3. In case of NO (the brake is off), integrated controller 10 proceeds to Step S5. The state of the brake is sensed by brake switch 27.

At Step S3, following the determination at Step S2 that the brake is in on-state, integrated controller 10 determines that the idle stop condition is satisfied, and then stops motor generator MG, and sets the target rotational speed of electric oil pump M/O/P to zero, and stops auxiliary motor S/M, and proceeds to Step S4. By this operation, driving of mechanical oil pump O/P and electric oil pump M/O/P is stopped so that hydraulic pressure supply source OIL stops supplying working oil. The stop of supply of working oil from hydraulic pressure supply source OIL causes working oil to be drained from line pressure circuit 101c and the circuit in transmission mechanism use hydraulic pressure system Sup, thereby lowering the line pressure PL and the hydraulic pressures supplied to primary pulley Pri, secondary pulley Sec, and second clutch CL2 (forward clutch FC or rearward brake RB).

At Step S4, following the operation at Step S3 that the motor generator is stopped and the target rotational speed of the electric oil pump is set to zero, integrated controller 10 sets both of the pressure regulation target value outputted to line pressure regulation valve 101 and the pressure regulation target value outputted to secondary pressure regulation valve 112b to an "IS command value", and proceeds to the return. The IS command value is greater than or equal to a target hydraulic pressure $P_{Th}$, wherein target hydraulic pressure $P_{Th}$ is determined in accordance with the driver-requested driving force. In this example, the IS command value is greater than or equal to a hydraulic pressure generated by a maximum possible flow rate discharged by electric oil pump M/O/P (maximum output pressure of electric oil pump M/O/P). In this situation, hydraulic pressure supply source OIL is stopped from supplying working oil, so that the hydraulic pressures supplied to line pressure regulation valve 101 and secondary pressure regulation valve 112b are equal to zero. Accordingly, the pressure regulation target values of valves 101, 112b are necessarily greater than the hydraulic pressures supplied to valves 101, 112b, so that each of line pressure regulation valve 101 and secondary pressure regulation valve 112b is put into fully open state. The target hydraulic pressure $P_{Th}$ is obtained by adding a predetermined margin based on variation and others, to a minimum hydraulic pressure required to allow the continuously variable transmission CVT and second clutch CL2 to transmit a torque produced by the vehicle drive source (engine Eng and motor generator MG) based on the driver-requested driving force. The target hydraulic pressure $P_{Th}$ is set to increase as the driver-requested driving force increases, wherein the magnitude of the driver-requested driving force is determined based on the accelerator opening in this example.

Figure 4:
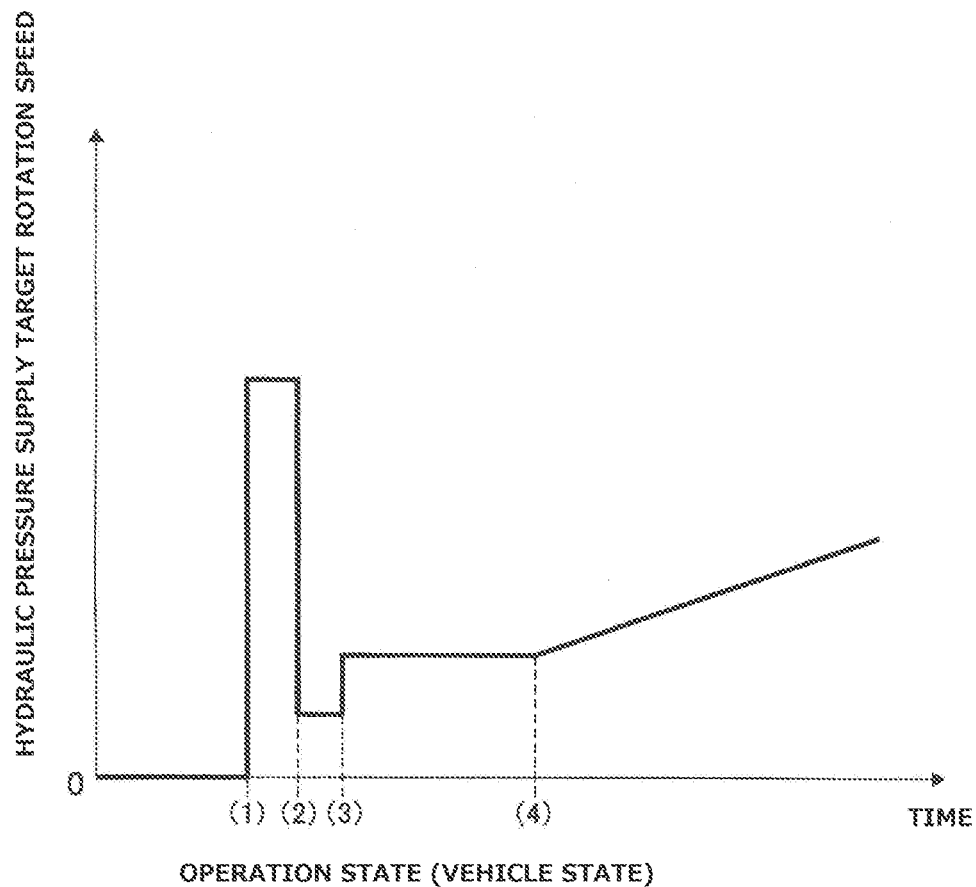
FIG. 4 is a characteristic line diagram showing a relationship between an operation state (vehicle state) and a hydraulic pressure supply target rotational speed.

At Step S5, following the determination at Step S2 that the brake is in off-state, integrated controller 10 determines that the accelerator pedal may be depressed, and driver's request for braking force is indicated, and sets the target rotational speed of electric oil pump M/O/P to a hydraulic pressure supply target rotational speed, and drives the auxiliary motor S/M, and then proceeds to Step S6. The hydraulic pressure supply target rotational speed is a target rotational speed that is set to conform the supply hydraulic pressure (discharge pressure) from electric oil pump M/O/P to target hydraulic pressure $P_{Th}$, and varies depending on the operation state (the state of the vehicle), as shown in FIG. 4. Accordingly, the control of electric oil pump M/O/P is started to conform the supply hydraulic pressure (discharge pressure) from electric oil pump M/O/P to target hydraulic pressure $P_{Th}$.

At Step S6, following the operation at Step S5 that the target rotational speed of the electric oil pump is set, or following a determination at Step S7 that the actual line pressure≤ a filling determination threshold value, or following a determination at Step S8 that a predetermined time period has not yet elapsed, integrated controller 10 sets both of the pressure regulation target value outputted to line pressure regulation valve 101 and the pressure regulation target value outputted to secondary pressure regulation valve 112b to the IS command value, and then proceeds to Step S7. In this situation, electric oil pump M/O/P is controlled in a manner that the supply hydraulic pressure (discharge pressure) conforms to target hydraulic pressure $P_{Th}$, so that the hydraulic pressure supplied to line pressure regulation valve 101 conforms to target hydraulic pressure $P_{Th}$. Under this condition, the setting the pressure regulation target value for line pressure regulation valve 101 to the IS command value, causes a condition of the supply hydraulic pressure> the pressure regulation target value in line pressure regulation valve 101, and puts the line pressure regulation valve 101 into fully-open state. Since line pressure regulation valve 101 is in fully-open state, no pressure regulation is performed by line pressure regulation valve 101, and the hydraulic pressure supplied to electric oil pump discharge oil passage 105 via the line pressure regulation valve 101 becomes equal to target hydraulic pressure $P_{Th}$. Accordingly, the setting the pressure regulation target value for secondary pressure regulation valve 112b to the IS command value, causes a condition of the supply hydraulic pressure> the pressure regulation target value in secondary pressure regulation valve 112b, and also puts the secondary pressure regulation valve 112b in fully-open state. The filling determination threshold value and the predetermined time period are described below.

At Step S7, following the operation at Step S5 that the pressure regulation target value is set, integrated controller 10 determines whether or not an actual line pressure PLr exceeds filling determination threshold value PLα. In case of YES (the actual line pressure> the filling determination threshold value), integrated controller 10 determines that line pressure circuit 101c is filled with working oil, and then proceeds to Step S8. In case of NO (the actual line pressure≤ the filling determination threshold value), integrated controller 10 determines that line pressure circuit 101c is not filled with working oil, and then returns to Step S6. The filling determination threshold value PLα is a value at which it can be determined that line pressure circuit 101c is filled with working oil, and may be arbitrarily set. The actual line pressure PLr is sensed by line pressure sensor 28.

At Step S8, following the determination at Step S7 that the actual line pressure> the filling determination threshold value, integrated controller 10 determines whether or not a predetermined time period has elapsed after actual line pressure PLr reaches filling determination threshold value PLα. In case of YES (the predetermined time period has elapsed), integrated controller 10 determines with reliability that actual line pressure PLr has increased up to target hydraulic pressure $P_{Th}$, and then proceeds to Step S9. In case of NO (the predetermined time period has not elapsed yet), integrated controller 10 determines that it is possible that actual line pressure PLr has not increased up to target hydraulic pressure $P_{Th}$, and then returns to Step S6. The predetermined time period is a time period with which it can be determined with reliability that line pressure circuit 101c is filled sufficiently with working oil, and actual line pressure PLr has reached target hydraulic pressure $P_{Th}$, and may be arbitrarily set.

At Step S9, following the determination at Step S8 that the predetermined time period has elapsed, integrated controller 10 determines whether or not the pressure regulation target value outputted to line pressure regulation valve 101 is greater than a normal command pressure. In case of YES (the pressure regulation target value> the normal command pressure), integrated controller 10 proceeds to Step S10. In case of NO (the pressure regulation target value≤ the normal command pressure), integrated controller 10 proceeds to Step S11. The normal command pressure is the target hydraulic pressure $P_{Th}$ determined in accordance with the driver-requested driving force.

Figure 5:
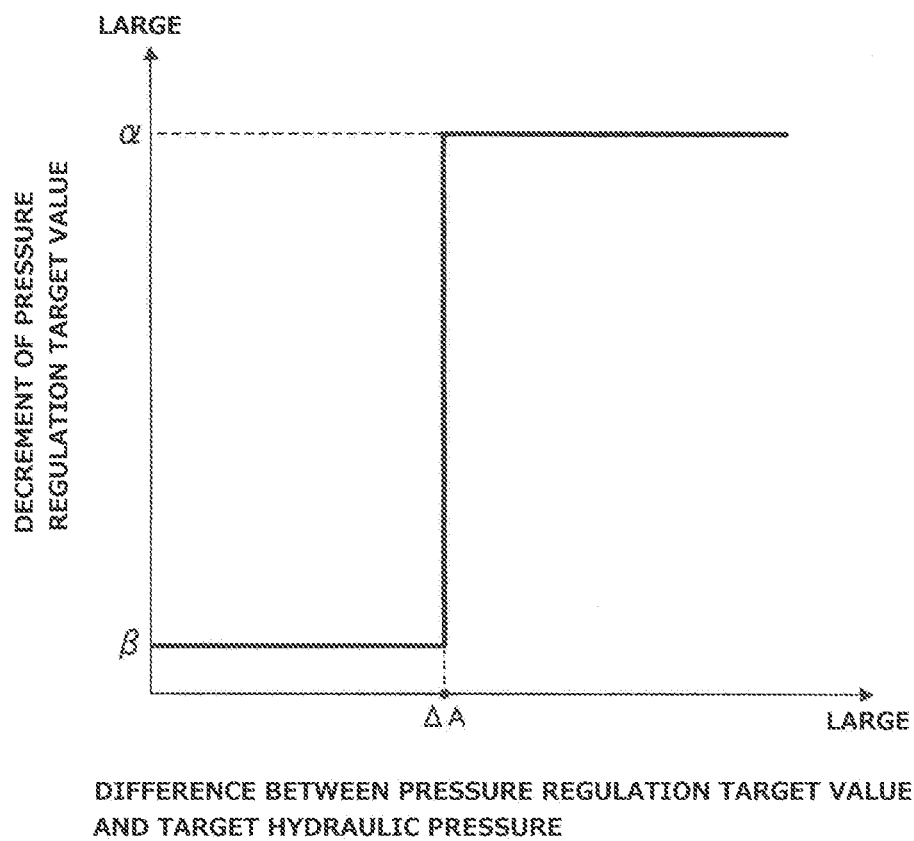
FIG. 5 is a map for setting a decrement of a pressure regulation target value of a line pressure regulation valve with respect to a difference between the pressure regulation target value and a target hydraulic pressure.

At Step S10, following the determination at Step S9 that the pressure regulation target value> the normal command pressure, integrated controller 10 sets the pressure regulation target value outputted to line pressure regulation valve 101 to the greater one of the normal command pressure and a value obtained by subtracting a predetermined decrement from the pressure regulation target value outputted in the last execution, and then returns to Step S9. In this situation, the pressure regulation target value outputted to secondary pressure regulation valve 112b is maintained at the IS command value. On the other hand, the pressure regulation target value of line pressure regulation valve 101 is reduced step-by-step by the predetermined decrement, by setting the pressure regulation target value outputted to line pressure regulation valve 101 to the value obtained by subtracting the predetermined decrement from the pressure regulation target value outputted in the last execution. The decrement is set depending on the difference between the pressure regulation target value and the target hydraulic pressure $P_{Th}$, as shown in FIG. 5. Specifically, the decrement is set to a relatively large value α, when the difference between the pressure regulation target value and the target hydraulic pressure $P_{Th}$ is larger than a value ΔA at which it can be determined that the pressure regulation target value has reached a vicinity value of the target hydraulic pressure. When the difference between the pressure regulation target value and the target hydraulic pressure $P_{Th}$ is smaller than or equal to the value ΔA, the decrement is set to a relatively small value β. As a result, the pressure regulation target value decreases down to the target hydraulic pressure vicinity value in a stepwise manner, and after reaching the target hydraulic pressure vicinity value, decreases gradually at a predetermined gradient of decrease. The target hydraulic pressure vicinity value is a value at which the line pressure PL can be suppressed from fluctuating, and the time period until setting the pressure regulation target value to the target hydraulic pressure $P_{Th}$ is not long unnecessarily, and may be set arbitrarily.

At Step S11, following the determination at Step S1 that the axle rotational speed>0, or following the determination at Step S9 that the pressure regulation target value≤ the normal command pressure, integrated controller 10 sets the pressure regulation target value outputted to line pressure regulation valve 101 to the normal command pressure, and then proceeds to the return. After the pressure regulation target value of line pressure regulation valve 101 is set to the normal command pressure, the pressure regulation target value outputted to secondary pressure regulation valve 112b is set to a value required for control of secondary pulley Sec. Specifically, while the pressure regulation target value of line pressure regulation valve 101 is set greater than the normal command pressure (target hydraulic pressure $P_{Th}$), the pressure regulation target value of secondary pressure regulation valve 112b is set to the value (the IS command value) greater than or equal to the pressure regulation target value of line pressure regulation valve 101.

Next, the following describes actions of the vehicular hydraulic control device according to the first embodiment, separately in sections [Actions of Line Pressure Control at Vehicle Start] and [Other Characteristic Actions].

[Actions of Line Pressure Control at Vehicle Start]

Figure 6:
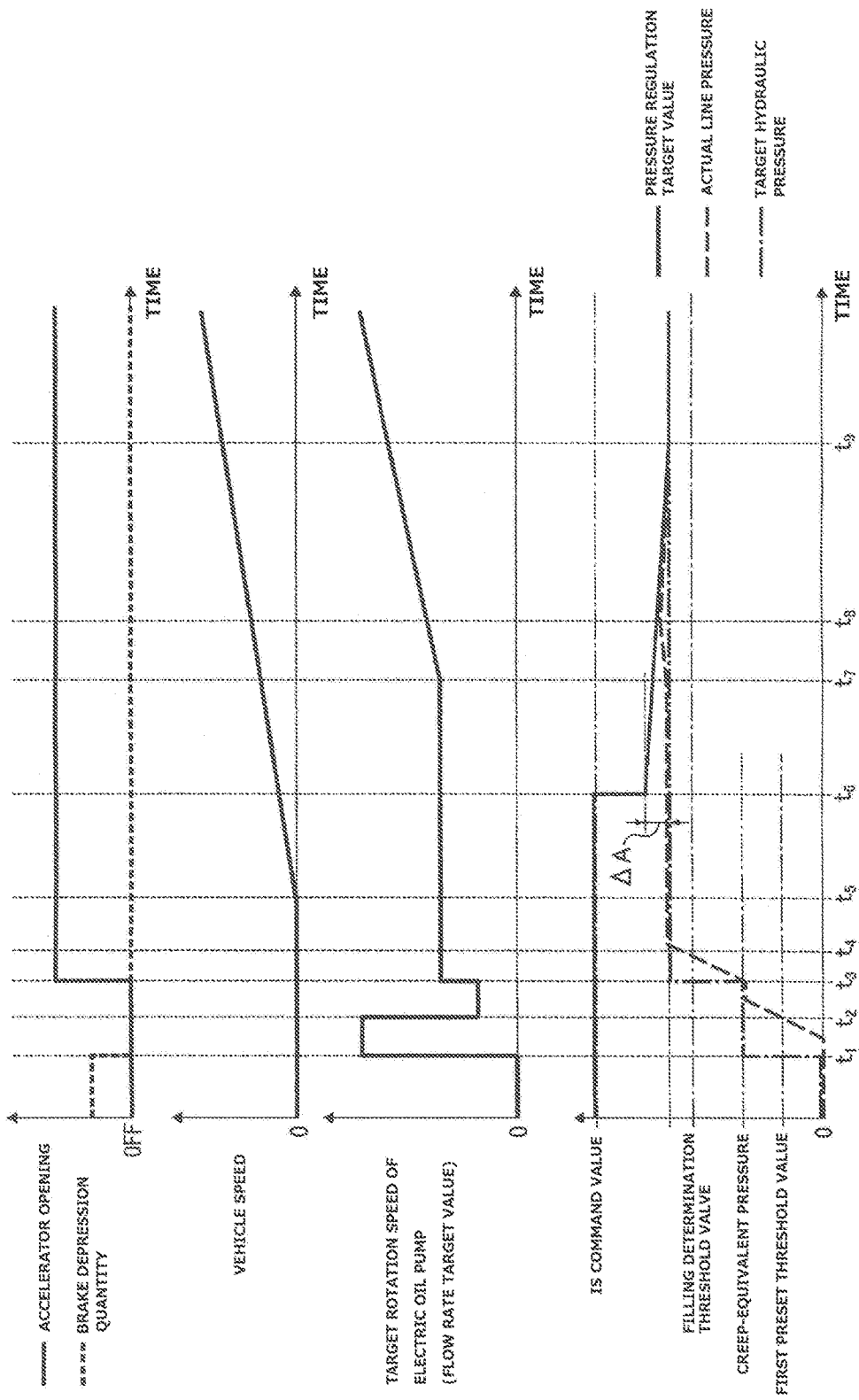
FIG. 6 is a time chart showing characteristics of an accelerator opening, a brake depression quantity, a vehicle speed, a target rotational speed of an electric oil pump, the pressure regulation target value, an actual line pressure, the target hydraulic pressure, at vehicle start, with the control device according to the first embodiment.

FIG. 6 is a time chart showing characteristics of the accelerator opening, a brake depression quantity, the vehicle speed, the target rotational speed of electric oil pump M/O/P, the pressure regulation target value, the actual line pressure, the target hydraulic pressure, at vehicle start, with the control device according to the first embodiment. The following describes actions of the line pressure control at vehicle start according to the first embodiment with reference to FIGS. 3 and 6.

In the time chart of FIG. 6, until a time instant t1, the vehicle speed is equal to zero with the brake depressed. Namely, the axle rotational speed is equal to zero, and the brake is in on-state. Accordingly, the idle stop condition is satisfied, and it proceeds as Step S1→Step S2→Step S3 in the flow chart of FIG. 3, where motor generator MG is stopped, and the target rotational speed of electric oil pump M/O/P is set to zero, to stop the auxiliary motor S/M. This causes the supply of working oil from hydraulic pressure supply source OIL to be stopped, and causes the working oil filling the line pressure circuit 101c and others to be drained.

Then, it proceeds to Step S4, where the pressure regulation target value outputted to line pressure regulation valve 101 and the pressure regulation target value outputted to secondary pressure regulation valve 112b are set to the IS command value. In this situation, the supply of working oil from hydraulic pressure supply source OIL is stopped, so that the hydraulic pressures supplied to valves 101, 112b are necessarily lower than the IS command value equal to the pressure regulation target values, and line pressure regulation valve 101 and secondary pressure regulation valve 112b are put into fully-open states. While the supplied hydraulic pressure is lower than the pressure regulation target value, even when the supply of working oil from hydraulic pressure supply source OIL is started, no drain of working oil into the drain circuit occurs, but all of the supplied working oil flows into line pressure circuit 101*c* and then is supplied to secondary pulley Sec.

Thereafter, at a time instant t1 when the brake pedal is released with line pressure regulation valve 101 and secondary pressure regulation valve 112*b* maintained in fully-open state, it proceeds as Step S1→Step S2→Step S5, where it is determined that the driver's request for driving force is indicated, and operation of auxiliary motor S/M is started, and the target rotational speed of electric oil pump M/O/P is set to the hydraulic pressure supply target rotational speed, and the control of line pressure PL by electric oil pump M/O/P is started. In this situation, in order to conform the supply hydraulic pressure from electric oil pump M/O/P to target hydraulic pressure $P_{Th}$, the target rotational speed of electric oil pump M/O/P (a target value of flow rate of electric oil pump M/O/P) varies as occasion arises as shown in FIG. 4. It further proceeds to Step S6, where the pressure regulation target value outputted to line pressure regulation valve 101 and the pressure regulation target value outputted to secondary pressure regulation valve 112*b* are set to the IS command value. In the first embodiment, the pressure regulation target value of line pressure regulation valve 101 has been set to the IS command value since a timing before time instant t1.

In this way, the hydraulic pressure of working oil (supply hydraulic pressure) supplied from electric oil pump M/O/P is set to the target hydraulic pressure $P_{Th}$, while the pressure regulation target value of line pressure regulation valve 101 and the pressure regulation target value of secondary pressure regulation valve 112*b* are set to the IS command value greater than or equal to target hydraulic pressure $P_{Th}$. This serves to cause the supply hydraulic pressures in line pressure regulation valve 101 and secondary pressure regulation valve 112*b* to be below the pressure regulation target value, and thereby maintain line pressure regulation valve 101 and secondary pressure regulation valve 112*b* in the fully-open state. The target hydraulic pressure $P_{Th}$ under such a condition of brake-off and accelerator-off is set to a predetermined pressure equivalent to creeping because the accelerator opening is equal to zero (the accelerator off).

At a time instant t2 when it is confirmed that electric oil pump M/O/P is rotating stably by confirming that actual line pressure PLr reaches a first predetermined value after supply of working oil of electric oil pump M/O/P is started, the target value of the flow rate is temporarily set to a low value in accordance with target hydraulic pressure $P_{Th}$. At a time instant t3 when the accelerator pedal is depressed to set the accelerator opening nonzero, target hydraulic pressure $P_{Th}$ is set in accordance with the magnitude of driver-requested driving force indicated by the accelerator opening. The target rotational speed is set to an arbitrary value corresponding to target hydraulic pressure $P_{Th}$, and is maintained at the value.

On the other hand, when the target rotational speed of electric oil pump M/O/P becomes equal to the value corresponding to target hydraulic pressure $P_{Th}$ at time instant t3, actual line pressure PLr increases toward the target hydraulic pressure $P_{Th}$. In this situation, the pressure regulation target value of line pressure regulation valve 101 is set to and maintained at the IS command value, so that line pressure regulation valve 101 is maintained in fully-open state. As a result, no pressure regulation of line pressure PL is performed by line pressure regulation valve 101, and change of actual line pressure PLr depends on the flow rate of working oil discharged by electric oil pump M/O/P (the supply hydraulic pressure from electric oil pump M/O/P). Namely, while no pressure regulation is performed by line pressure regulation valve 101, line pressure PL is controlled to target hydraulic pressure $P_{Th}$ by electric oil pump M/O/P.

At a time instant t4 when actual line pressure PLr exceeds the predetermined filling determination threshold value PLα, it proceeds as Step S6→Step S7. At time instant t4, since the predetermined time period has not yet elapsed after actual line pressure PLr reaches the filling determination threshold value PLα, it returns as Step S7→Step S6, where the pressure regulation target value of line pressure regulation valve 101 is maintained at the IS command value so that line pressure regulation valve 101 is maintained in fully-open state. Namely, while no pressure regulation of line pressure PL is performed by line pressure regulation valve 101, the control of the line pressure by electric oil pump M/O/P continues.

Thereafter, actual line pressure PLr reaches target hydraulic pressure $P_{Th}$, so that the vehicle is allowed to run with continuously variable transmission CVT and second clutch CL2 supplied with required hydraulic pressures. Then, the vehicle speed starts to increase at a time instant t5.

At a time instant t6 when the predetermined time period has elapsed after the actual line pressure PLr reaches the filling determination threshold value PLα, it proceeds as Step S7→Step S8→Step S9, and then determines whether or not the pressure regulation target value of line pressure regulation valve 101 is greater than the normal command pressure, namely, greater than the target hydraulic pressure $P_{Th}$. At time instant t6, since the pressure regulation target value> target hydraulic pressure $P_{Th}$, it proceeds to Step S10, where the pressure regulation target value is set to a value smaller by the predetermined decrement than the current pressure regulation target value. Specifically, the pressure regulation target value of line pressure regulation valve 101 is set to the value obtained by subtracting the predetermined decrement α from the IS command value, namely, the target hydraulic pressure vicinity value (the value different by ΔA from target hydraulic pressure $P_{Th}$). Incidentally, the pressure regulation target value outputted to secondary pressure regulation valve 112*b* is maintained at the IS command value.

After time instant t6, since the pressure regulation target value of line pressure regulation valve 101 becomes the target hydraulic pressure vicinity value, it proceeds as Step S9→Step S10→Step S9, and thus repeats this operation, so that the pressure regulation target value is reduced by the amount β by every calculation, and thereby decreases gradually at the predetermined decrease gradient. Even after time instant t6, since the pressure regulation target value of line pressure regulation valve 101 is higher than or equal to target hydraulic pressure $P_{Th}$, no pressure regulation of line pressure PL is performed by line pressure regulation valve 101, and the control of the line pressure by electric oil pump M/O/P continues.

At a time instant t7 when the predetermined time period has elapsed after the pressure regulation target value of line pressure regulation valve 101 starts to decrease, the pressure regulation target value of line pressure regulation valve 101 is assumed to get close to target hydraulic pressure $P_{Th}$, and the hydraulic pressure supply target rotational speed gradually increases, and the target rotational speed of electric oil pump M/O/P increases. This causes the actual line pressure PLr to rise, so that pressure regulation of line pressure PL can be started by line pressure regulation valve 101 soon.

Whereas the actual line pressure PLr starts to rise at time instant t7, the pressure regulation target value of line pressure regulation valve 101 converges toward the target hydraulic pressure $P_{Th}$, so that the pressure regulation target value of line pressure regulation valve 101 coincides with actual line pressure PLr at a time instant t8. This conformation of the pressure of working oil supplied to line pressure regulation valve 101 to the pressure regulation target value, causes line pressure regulation valve 101 to start the pressure regulation of line pressure PL.

Thereafter, the pressure regulation target value of line pressure regulation valve 101 is made to converge toward target hydraulic pressure $P_{Th}$. When the pressure regulation target value becomes equal to the target hydraulic pressure $P_{Th}$ (normal command pressure) at a time instant t9, it proceeds as Step S9→Step S11, where normal line pressure control is performed by line pressure regulation valve 101.

In this way, the vehicular hydraulic control device according to the first embodiment is configured to set the pressure regulation target value of line pressure regulation valve 101 to the IS command value greater than the target hydraulic pressure $P_{Th}$, when determining an indication of driver's request for driving force while mechanical oil pump O/P and electric oil pump M/O/P are stopped to drain working oil from line pressure circuit 101c. The vehicular hydraulic control device is further configured to set the target rotational speed of electric oil pump M/O/P to the hydraulic pressure supply target rotational speed in order to conform line pressure PL to target hydraulic pressure $P_{Th}$ by the discharge flow rate from electric oil pump M/O/P. Namely, electric oil pump M/O/P starts to be controlled to conform the supply hydraulic pressure of electric oil pump M/O/P to the target hydraulic pressure $P_{Th}$.

Here, a case is considered in which pressure regulation of line pressure PL is performed by a line pressure regulation valve under a condition that the quantity of oil in a hydraulic pressure circuit has decreased when an oil pump is driven. In this situation, in order to raise the line pressure, the line pressure regulation valve is operated to reduce the quantity of drained oil with a spool moved to a side closing a drain port. Under this condition, if a large quantity of working oil is supplied from the oil pump, line pressure PL overshoots a target hydraulic pressure. When the overshooting is sensed, the line pressure regulation valve is operated to move rapidly the spool to a side opening the drain port in order to increase the quantity of drained oil, and thereby suppress the overshooting. As a result, an excess quantity of working oil is drained, so that line pressure PL undershoots the target hydraulic pressure. Also thereafter, the adjustment of the quantity of drained oil (overshooting and undershooting of line pressure PL) is repeated based on the magnitude of line pressure PL resulting from the drain of working oil, to make line pressure PL converge to the target hydraulic pressure. In this way, in the case where line pressure PL is regulated by the line pressure regulation valve, it constitutes a feedback control, and thereby causes hunting of line pressure PL.

In contrast, the configuration of setting the pressure regulation target value of line pressure regulation valve 101 greater than or equal to the target hydraulic pressure $P_{Th}$, and controlling the electric oil pump M/O/P to conform the discharge pressure of electric oil pump M/O/P to the target hydraulic pressure $P_{Th}$, serves to set the line pressure regulation valve 101 in fully-open state, and control the line pressure PL by the discharge flow rate of electric oil pump M/O/P with line pressure regulation valve 101 separated from the pressure regulation of line pressure PL. This serves to suppress the line pressure PL from hunting due to feedback control with line pressure regulation valve 101 for regulating the line pressure PL.

[Other Characteristic Actions]

The vehicular hydraulic control device according to the first embodiment is configured to set the pressure regulation target value of secondary pressure regulation valve 112b to the value (IS command value) greater than or equal to the pressure regulation target value of line pressure regulation valve 101, while the pressure regulation target value of line pressure regulation valve 101 is set greater than the target hydraulic pressure $P_{Th}$ (normal command pressure).

When the hydraulic pressure supplied to secondary pulley Sec is adjusted by secondary pressure regulation valve 112b, there is a problem that hunting of the pulley supply pressure also occurs because secondary pressure regulation valve 112b is controlled also by feedback control. Against that, the setting the pressure regulation target value of secondary pressure regulation valve 112b to the IS command value (greater than or equal to the pressure regulation target value of line pressure regulation valve 101) while the pressure regulation target value of line pressure regulation valve 101 is greater than target hydraulic pressure $P_{Th}$ and no line pressure regulation is performed by line pressure regulation valve 101, serves to prevent the pressure regulation of secondary pressure regulation valve 112b from being performed, wherein secondary pressure regulation valve 112b is provided for regulating the line pressure PL. Accordingly, the hydraulic pressure supplied to secondary pulley Sec is controlled also by electric oil pump M/O/P. This prevents hunting of the hydraulic pressure supplied to secondary pulley Sec.

The first embodiment is configured to set the IS command value greater than or equal to the hydraulic pressure caused by the maximum possible dischargeable flow rate of electric oil pump M/O/P (the maximum output pressure of electric oil pump M/O/P). This serves to prevent the pressure regulation of line pressure regulation valve 101 and secondary pressure regulation valve 112b in whichever situation of vehicle drive. The pressure regulation of line pressure regulation valve 101 or secondary pressure regulation valve 112b occurs when the supply hydraulic pressure supplied to the valve is higher than the pressure regulation target value. However, the setting the pressure regulation target value of line pressure regulation valve 101 or secondary pressure regulation valve 112b greater than the maximum output pressure of electric oil pump M/O/P, serves to prevent the supply hydraulic pressure supplied to the valve from becoming greater than the pressure regulation target value. This serves to prevent the pressure regulation of line pressure regulation valve 101 and others.

The first embodiment is further configured to: determine that actual line pressure PLr has increased up to target hydraulic pressure $P_{Th}$ when the predetermined time period has elapsed after the actual line pressure PLr reaches the filling determination threshold value PLα; and then starts to reduce the pressure regulation target value of line pressure regulation valve 101. When the pressure regulation target value of line pressure regulation valve 101 is set greater than target hydraulic pressure $P_{Th}$, it adversely affects the responsiveness of reducing the hydraulic pressure supplied to secondary pulley Sec. Namely, if the pressure regulation target value of line pressure regulation valve 101 is high in a situation that a request for reducing the secondary pulley pressure is presented to perform an upshift in response to increase of the vehicle speed, it takes time to reduce the actual line pressure PLr, and thereby requires a time period for pressure regulation at a downstream side of line pressure regulation valve 101, where the upshift cannot be carried out. However, the starting to reduce the pressure regulation target value of line pressure regulation valve 101 at the timing when it is determined that the actual line pressure PLr has increased up to target hydraulic pressure $P_{Th}$, serves to eliminate the necessity of a long time period when no pressure regulation is performed by line pressure regulation valve 101, and thereby achieve smooth shifting and others.

The first embodiment is further configured to implement the reduction of the pressure regulation target value of line pressure regulation valve 101 by reducing the same down to the target hydraulic pressure vicinity value in a stepwise manner. When the pressure regulation target value has reached the target hydraulic pressure vicinity value (when the difference between the pressure regulation target value and the target hydraulic pressure vicinity value becomes equal to the value ΔA), the pressure regulation target value is made to converge to the target hydraulic pressure $P_{Th}$ (normal command pressure) at the predetermined decrease gradient. If the convergence of the pressure regulation target value to the target hydraulic pressure $P_{Th}$ (normal command pressure) is implemented by reducing the pressure regulation target value at the predetermined decrease gradient when the difference between the pressure regulation target value and target hydraulic pressure $P_{Th}$ is large, it requires some time period when the pressure regulation target value reaches the target hydraulic pressure $P_{Th}$ (normal command pressure). In contrast, in the first embodiment, the feature that the pressure regulation target value is reduced in the stepwise manner down to the target hydraulic pressure vicinity value when the difference is large, serves to shorten the time period required to converge the pressure regulation target value to the target hydraulic pressure $P_{Th}$ (normal command pressure), and thereby achieve a quick shift from the line pressure control based on electric oil pump M/O/P to the pressure regulation based on line pressure regulation valve 101. The convergence of the pressure regulation target value to target hydraulic pressure $P_{Th}$ (normal command pressure) at the predetermined decrease gradient serves to suppress the actual line pressure PLr from fluctuating during shifting from the line pressure control based on electric oil pump M/O/P to the pressure regulation based on line pressure regulation valve 101, and thereby prevent fluctuation of the hydraulic pressure supplied to secondary pulley Sec and others.

Furthermore, the first embodiment is configured such that hydraulic pressure supply source OIL includes mechanical oil pump O/P and electric oil pump M/O/P, and when the idle stop condition is satisfied, both of motor generator MG for driving the mechanical oil pump O/P and auxiliary motor S/M for driving the electric oil pump M/O/P are stopped. This serves to enhance the fuel efficiency, and allow the line pressure PL to be controlled with electric oil pump M/O/P which is not restricted by the vehicle speed and the rotational speed of the vehicle drive source (motor rotational speed), when a driving force is requested with the vehicle stationary (at vehicle start), thereby suitably preventing the line pressure PL from hunting. The idle stop condition of the first embodiment is the condition where the brake is in on-state and the accelerator is in off-state, but may be a condition where the vehicle is running in a coast running state with the accelerator pedal released.

The following describes effects. The vehicular hydraulic control device according to the first embodiment produces the following listed effects.

<1> A vehicular hydraulic control device includes: a hydraulic pressure source (electric oil pump M/O/P); a line pressure regulation valve (101) configured to regulate a discharge pressure outputted from the hydraulic pressure source (electric oil pump M/O/P); and a hydraulic pressure controller (integrated controller 10) configured to perform a first operation in response to an indication of driver's request for driving force when the hydraulic pressure source (electric oil pump M/O/P) is at rest, wherein the first operation includes: starting to control the hydraulic pressure source (electric oil pump M/O/P) in a manner to conform the discharge pressure to a target hydraulic pressure ($P_{Th}$), wherein the target hydraulic pressure ($P_{Th}$) is determined in accordance with a driver-requested driving force; and setting a pressure regulation target value of the line pressure regulation valve (101) greater than or equal to the target hydraulic pressure ($P_{Th}$). This serves to suppress a line pressure (PL) from hunting, while regulating the line pressure (PL) to the target hydraulic pressure ($P_{Th}$).

<2> The vehicular hydraulic control device is further configured such that: a driving force transmission part (secondary pulley Sec) is disposed between a vehicle drive source (motor generator MG) and a driving wheel (left and right driving wheels LT, RT) for power transmission therebetween; the vehicular hydraulic control device further comprises a power transmission part pressure regulation valve (secondary pressure regulation valve 112b) configured to generate a hydraulic pressure supplied to the driving force transmission part (secondary pulley Sec), by regulating a line pressure (PL); and the hydraulic pressure controller (integrated controller 10) is further configured to set a pressure regulation target value of the power transmission part pressure regulation valve (secondary pressure regulation valve 112b) greater than or equal to the pressure regulation target value of the line pressure regulation valve (101). This serves to prevent fluctuation of the hydraulic pressure supplied to the secondary pulley (Sec), because no pressure regulation is made by the secondary pressure regulation valve (112b) for regulating the line pressure (PL), and the hydraulic pressure supplied to the secondary pulley (Sec) is controlled by the electric oil pump (M/O/P), in addition to the effect of <1>.

<3> The vehicular hydraulic control device is further configured such that the hydraulic pressure controller (integrated controller 10) is further configured to set the pressure regulation target value of the line pressure regulation valve (101) greater than or equal to a maximum output pressure of the hydraulic pressure source (electric oil pump M/O/P). This serves to prevent the pressure regulation from being performed by the line pressure regulation valve (101) and others independently of the situation of vehicle driving, in addition to the effect of <1> or <2>.

<4> The vehicular hydraulic control device is further configured such that the hydraulic pressure controller (integrated controller 10) is further configured to start to reduce the pressure regulation target value of the line pressure regulation valve (101) toward the target hydraulic pressure ($P_{Th}$) in response to a determination that a line pressure (PL) increases up to the target hydraulic pressure ($P_{Th}$). This serves to prevent a time period when no pressure regulation is performed by the line pressure regulation valve (101), from being long unnecessarily, and thereby start a shift control and others quickly, in addition to the effect of one of <1> to <3>.

<5> The vehicular hydraulic control device is further configured such that the hydraulic pressure controller (integrated controller 10) is further configured to: reduce the pressure regulation target value of the line pressure regulation valve (101) down to a vicinity value of the target hydraulic pressure ($P_{Th}$) in a stepwise manner; and reduce the pressure regulation target value of the line pressure regulation valve (101) down to the target hydraulic pressure ($P_{Th}$) at a predetermined decrease gradient, after the pressure regulation target value of the line pressure regulation valve (101) has reached the vicinity value of the target hydraulic pressure ($P_{Th}$). This serves to shorten a time period for conforming the pressure regulation target value to the target hydraulic pressure ($P_{Th}$), and prevent the line pressure (PL) and others from fluctuating, in addition to the effect of <4>.

<6> The vehicular hydraulic control device is further configured such that: the hydraulic pressure source includes a first oil pump (mechanical oil pump O/P) and a second oil pump (electric oil pump M/O/P); the first oil pump (mechanical oil pump O/P) is configured to be driven by the vehicle drive source (motor generator MG) for hydraulic pressure supply; the second oil pump (electric oil pump M/O/P) is configured to be driven by an electric motor (auxiliary motor S/M) other than the vehicle drive source (motor generator MG) for hydraulic pressure supply; and while an idle stop condition is satisfied, hydraulic pressure supply of the hydraulic pressure source is stopped by stopping the vehicle drive source (motor generator MG) and the electric motor (auxiliary motor S/M). This serves to enhance the fuel efficiency, and prevent the line pressure (PL) and others from hunting when a driving force is requested at vehicle stop, in addition to the effect of one of <1> to <5>.

Although the vehicular hydraulic control device according to the present invention has been described with reference to the first embodiment as described above, specific configuration of the present invention is not limited to the first embodiment, but may be carried out with design modification and addition without going out of the substance of the present invention related to the present claims.

The first embodiment is configured to set the pressure regulation target value of line pressure regulation valve 101 to the IS command value while the idle stop condition is satisfied, and includes the exemplified configuration that the pressure regulation target value is set to the IS command value before the timing when it is determined that driver's request for driving force is indicated, but is not limited so. For example, when it is not determined that driver's request for driving force is indicated even while the idle stop condition is satisfied, the pressure regulation target value of line pressure regulation valve 101 is set to zero. Thereafter, the pressure regulation target value may be set to the IS command value, when it is determined that driver's request for driving force is indicated. Furthermore, the pressure regulation target value may be set to the IS command value in response to accelerator-on action as a trigger, based on determination that driver's request for driving force is indicated by actual depression of the accelerator pedal. Namely, the "indication of driver's request for driving force" includes actual occurrence of driving force request, and prediction (estimation) of occurrence of driving force request. If the indication of driver's request for driving force is determined based on prediction of occurrence of driving force request, supply of working oil from electric oil pump M/O/P can be started at a timing before actual occurrence of request (accelerator-on action, for example). This serves to shorten the time period when line pressure PL becomes equal to the target hydraulic pressure.

The first embodiment is configured to determine that line pressure PL increases up to the target hydraulic pressure, in response to the condition that actual line pressure PLr reaches the filling determination threshold value PLα, and the predetermined time period has elapsed after the actual line pressure PLr reaches filling determination threshold value PLα, but is not limited so. For example, it may be determined that line pressure PL increases up to the target hydraulic pressure, in response to a condition where it is sensed that actual line pressure PLr has reached target hydraulic pressure $P_{Th}$. In this case, the reduction of the pressure regulation target value can be started, based on the confirmation that line pressure PL has increased up to target hydraulic pressure $P_{Th}$. Furthermore, it may be determined that line pressure PL increases up to the target hydraulic pressure, in response to a condition where it is sensed that actual line pressure PLr has reached a threshold value that is set lower by a predetermined margin than the target hydraulic pressure $P_{Th}$. In this case, the determination is based on the prediction of increase of line pressure PL, so that the reduction of the pressure regulation target value can be started in early timing. Moreover, it may be determined that line pressure PL increases up to the target hydraulic pressure, in response to a condition that a predetermined time period has elapsed after the hydraulic pressure source (electric oil pump M/O/P) starts to discharge working oil. In this case, it is not required to sense actual line pressure PLr, and line pressure sensor 28 is not required. This serves to reduce the cost.

Furthermore, the first embodiment is configured to set the decrement of the pressure regulation target value when the difference between the pressure regulation target value and target hydraulic pressure $P_{Th}$ is larger than the value ΔA, to the predetermined value α, but is not limited so. The value α does not need to be constant, but may be a value for setting the difference between the pressure regulation target value and the target hydraulic pressure $P_{Th}$ to the value ΔA, namely, a value obtained by subtracting the value ΔA from the pressure regulation target value.

The first embodiment has the exemplified configuration that line pressure PL is controlled by electric oil pump M/O/P driven by auxiliary motor S/M, but is not limited so. The line pressure control may be performed by mechanical oil pump O/P driven by motor generator MG as the vehicle drive source, or may be performed by an oil pump driven by engine Eng or an oil pump coupled to the axle. The vehicle drive source may be engine Eng.

The first embodiment has the exemplified configuration that actual line pressure PLr is increased up to target hydraulic pressure $P_{Th}$ by electric oil pump M/O/P, but may be configured, for example, such that in a case where actual line pressure PLr does not increase up to target hydraulic pressure $P_{Th}$ only with the discharge flow rate from electric oil pump M/O/P, the vehicle drive source (motor generator MG) is driven to drive the mechanical oil pump O/P. It may be configured to start the reduction of the pressure regulation target value of line pressure regulation valve 101, in response to a determination that line pressure PL is increased up to target hydraulic pressure $P_{Th}$ by the discharge flow rate of mechanical oil pump O/P.

In the first embodiment, the vehicular hydraulic control device according to the present invention is applied to the hybrid vehicle including the engine Eng and motor generator MG, but is not limited so. The vehicular hydraulic control device according to the present invention may be applied to an electric vehicle provided only with motor generator MG, or an engine vehicle provided only with engine Eng having an idle-stop function, or a plug-in hybrid vehicle, or a fuel cell vehicle, etc.

The first embodiment has the exemplified configuration that secondary pressure regulation valve 112b is provided to control the hydraulic pressure supplied to secondary pulley Sec as the driving force transmission part, and continuously variable transmission CVT is of a type of double pressure regulation, but is not limited so. Continuously variable transmission CVT may be of a type of single pressure regulation where line pressure PL is supplied as it is to secondary pulley Sec, and a shift control is performed by controlling a hydraulic pressure supplied to primary pulley Pri. The transmission mechanism is not limited to continuously variable transmission CVT, but may be a stepwise variable automatic transmission. In this case, the driving force transmission part is a clutch that is engaged by supply of hydraulic pressure at vehicle start.

The invention claimed is:

1. A vehicular hydraulic control device comprising:
   a hydraulic pressure source;
   a line pressure regulation valve configured to regulate a discharge pressure outputted from the hydraulic pressure source; and
   a hydraulic pressure controller configured to perform a first operation in response to an indication of driver's request for driving force when the hydraulic pressure source is at rest, wherein the first operation includes:
      starting to control the hydraulic pressure source in a manner to conform the discharge pressure to a target hydraulic pressure, wherein the target hydraulic pressure is determined in accordance with a driver-requested driving force; and
      setting a pressure regulation target value of the line pressure regulation valve greater than or equal to the target hydraulic pressure.

2. The vehicular hydraulic control device as claimed in claim 1, wherein:
   a driving force transmission part is disposed between a vehicle drive source and a driving wheel for power transmission therebetween;
   the vehicular hydraulic control device further comprises a power transmission part pressure regulation valve configured to generate a hydraulic pressure supplied to the driving force transmission part, by regulating a line pressure; and
   the hydraulic pressure controller is further configured to set a pressure regulation target value of the power transmission part pressure regulation valve greater than or equal to the pressure regulation target value of the line pressure regulation valve, during the first operation.

3. The vehicular hydraulic control device as claimed in claim 1, wherein the hydraulic pressure controller is further configured to set the pressure regulation target value of the line pressure regulation valve greater than or equal to a maximum output pressure of the hydraulic pressure source, during the first operation.

4. The vehicular hydraulic control device as claimed in claim 1, wherein the hydraulic pressure controller is further configured to start to reduce the pressure regulation target value of the line pressure regulation valve toward the target hydraulic pressure in response to a determination that a line pressure increases up to the target hydraulic pressure, during the first operation.

5. The vehicular hydraulic control device as claimed in claim 4, wherein the hydraulic pressure controller is further configured to:
   reduce the pressure regulation target value of the line pressure regulation valve down to a vicinity value of the target hydraulic pressure in a stepwise manner; and
   reduce the pressure regulation target value of the line pressure regulation valve down to the target hydraulic pressure at a predetermined decrease gradient, after the pressure regulation target value of the line pressure regulation valve has reached the vicinity value of the target hydraulic pressure, during the first operation.

6. The vehicular hydraulic control device as claimed in claim 1, wherein:
   the hydraulic pressure source includes a first oil pump and a second oil pump;
   the first oil pump is configured to be driven by the vehicle drive source for hydraulic pressure supply;
   the second oil pump is configured to be driven by an electric motor other than the vehicle drive source for hydraulic pressure supply; and
   while an idle stop condition is satisfied, hydraulic pressure supply of the hydraulic pressure source is stopped by stopping the vehicle drive source and the electric motor.

7. A vehicular hydraulic control method comprising:
   performing a first operation by a controller in response to an indication of driver's request for driving force when a hydraulic pressure source is at rest, wherein the first operation includes:
      starting to control the hydraulic pressure source in a manner to conform a discharge pressure to a target hydraulic pressure, wherein the discharge pressure is outputted from the hydraulic pressure source, and wherein the target hydraulic pressure is determined in accordance with a driver-requested driving force; and
      setting a pressure regulation target value of a line pressure regulation valve greater than or equal to the target hydraulic pressure, wherein the line pressure regulation valve is configured to regulate the discharge pressure.

* * * * *